US006431495B1

(12) United States Patent
Lawyer (10) Patent No.: US 6,431,495 B1
(45) Date of Patent: Aug. 13, 2002

(54) SINGLE RELEASE SYSTEM

(76) Inventor: Steven V. Lawyer, 427 Fleming Building, Des Moines, IA (US) 50309

(*) Notice: Subject to any disclaimer, the term of this patent is extended or adjusted under 35 U.S.C. 154(b) by 53 days.

(21) Appl. No.: 09/649,253

(22) Filed: Aug. 28, 2000

(51) Int. Cl.⁷ .............................................. B64D 17/38
(52) U.S. Cl. .................................... 244/149; 244/151 A
(58) Field of Search ................................ 244/147, 148, 244/149, 151 A, 151 B (56) References Cited

U.S. PATENT DOCUMENTS 3,934,848 A * 1/1976 Snyder ................... 244/151 A
4,923,150 A * 5/1990 Calkins et al. .......... 244/148 X
6,056,242 A * 5/2000 Collins ................... 244/147 X
6,086,019 A * 7/2000 Ciuffi et al. .............. 244/149

* cited by examiner

Primary Examiner—Robert P. Swiatek
(74) Attorney, Agent, or Firm—Brett J. Trout

(57) ABSTRACT

A variable release system comprising a first catch, a second catch, and a container containing at least a portion of each catch. A cord is coupled to the first catch to allow the first catch to be moved from the container. The second catch is releasably coupled to the first catch to draw the second catch out of the container as the cord pulls the first catch out of the container. The second catch is constructed so as to cause the second catch to engage the container and substantially prevent dislodgement relative thereto once the first catch has been removed. Preferably, the system is operable in the reverse so that if the second catch, is removed from the container, the first catch becomes engaged to the container.

21 Claims, 6 Drawing Sheets

SINGLE RELEASE SYSTEM

BACKGROUND OF THE INVENTION

1. Field of the Invention

The present invention relates in general to an actuation line release system which releases an actuation line without actuation as long as another actuation line remains attached to the system and, more particularly, to a dual reserve static line for a parachute system.

2. Description of the Prior Art

It is generally known in the art to couple the main canopy of a parachute system to a static line to automatically release the canopy when tension is applied to the static line. Similarly, it is known to couple a reserve static line between a riser of a main parachute and a reserve canopy. Such a system is designed to automatically actuate the reserve canopy when the main riser is released from the harness of the parachute assembly.

A general drawback associated with such prior art reserve static lines is that, in some situations, only a single riser may release from the harness during an emergency procedure. If this single riser happens to be the riser coupled to the reserve static line, the reserve static line actuates the reserve canopy. If the reserve canopy inflates while the remaining main riser is still attached to the harness, there is a significant risk of the reserve canopy becoming entangled with the main canopy. Such an entanglement may leave neither chute fully functional and could cause a fatality.

Coupling reserve static lines to both main risers would exacerbate, rather than alleviate, the problem. If reserve static lines were connected to both main risers, then any time a single riser released, the reserve canopy would also release, thereby increasing the odds of an entanglement with the main canopy.

Accordingly, it would be desirable to provide a reserve static line system which allowed either main riser to release from the harness without actuating the reserve canopy until the remaining riser released from the harness. In this way, the reserve static line would not actuate the reserve canopy until the main canopy had completely disconnected from the harness, thereby eliminating the likelihood of an entanglement with the main canopy. The difficulties encountered in the prior art discussed hereinabove are substantially eliminated by the present invention.

SUMMARY OF THE INVENTION

In an advantage provided by this invention, a single release system allows actuation lines to release without triggering actuation until tension is applied to a sole remaining actuation line.

Advantageously, this invention provides a dual reserve static line system for a parachute system which reduces the likelihood of entanglement between a reserve canopy and main canopy.

Advantageously, this invention provides a dual reserve static line system for a parachute assembly which is lightweight.

Advantageously, this invention provides a dual reserve static line assembly for a parachute system which is durable and reliable.

Advantageously, this invention provides a dual reserve static line assembly which is low cost to manufacture.

Advantageously, this invention provides a dual reserve static line assembly which is flexible.

Advantageously, this invention provides a dual reserve static line assembly with few individual parts.

Advantageously, in a preferred example of this invention, a variable release system comprising a first catch, a second catch, a container containing at least a portion of the first catch and at least a portion of the second catch, means for releasing the first catch from the container; means for removing the second catch from the container when the first catch is released from the container and means for connecting the second catch to the container when the first catch is released from the container.

BRIEF DESCRIPTION OF THE DRAWINGS

This invention will now be described, by way of example, with reference to the accompanying drawings in which.

DETAILED DESCRIPTION OF THE PREFERRED EMBODIMENT

Figure 1:
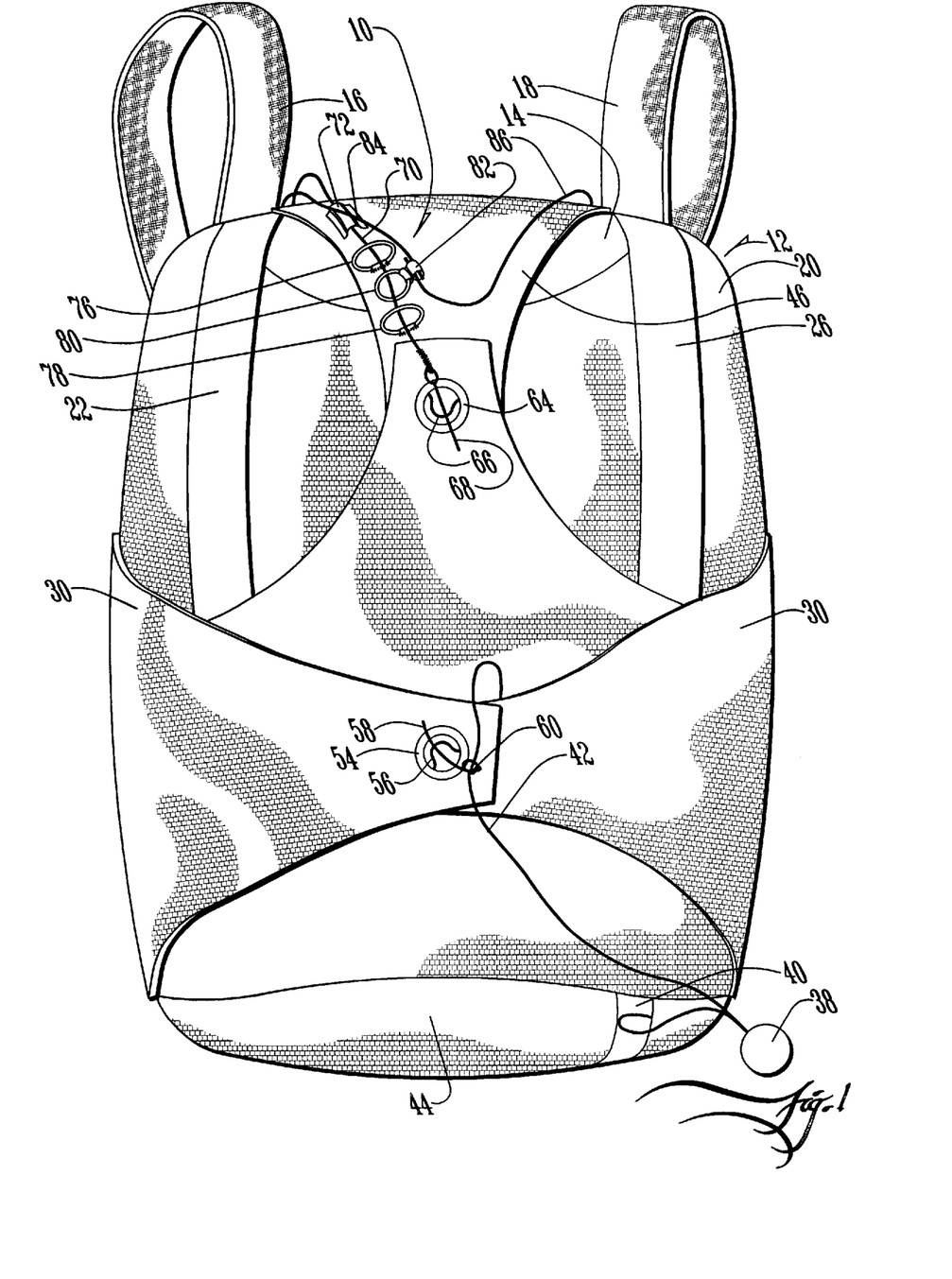
FIG. 1 illustrates an example rear elevation of the parachute system of the present invention.
Figure 2:
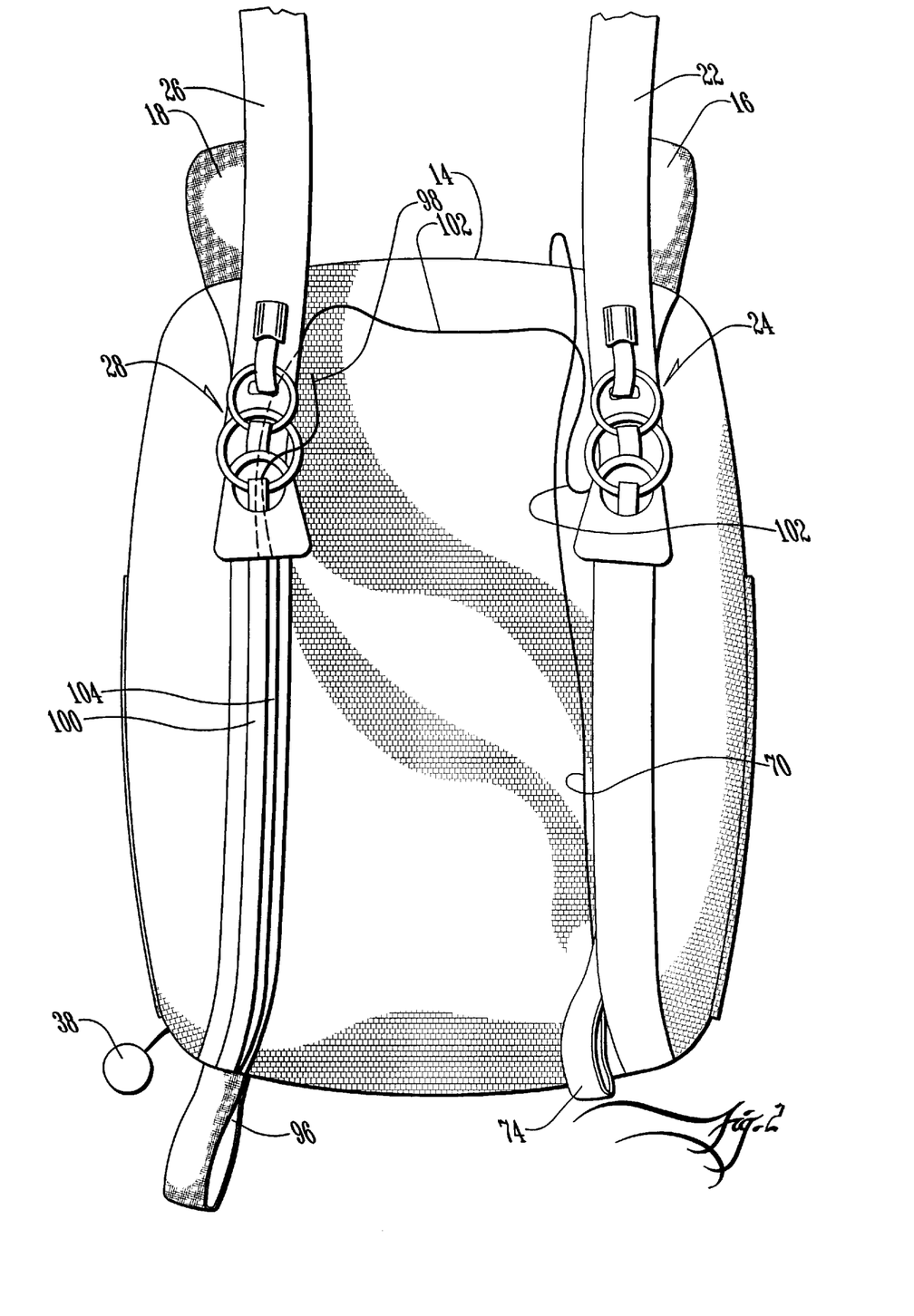
FIG. 2 illustrates a front elevation of the parachute system of FIG. 1.

Referring to FIG. 1, an actuation assembly (10), according to this invention, is shown. The actuation assembly (10) is part of a rig (12). The rig (12) includes a harness/container (14) having a left lift webbing (16) and right lift webbing (18). As shown in FIG. 2, a left riser (22) is coupled to the left lift webbing (16) by a left quick release assembly (24). Although the left quick release assembly (24) may be of any type known in the art, in the preferred embodiment the left quick release assembly (24) is of a "three-ring release" type, such as that often used with prior art parachute systems.

Figure 3:
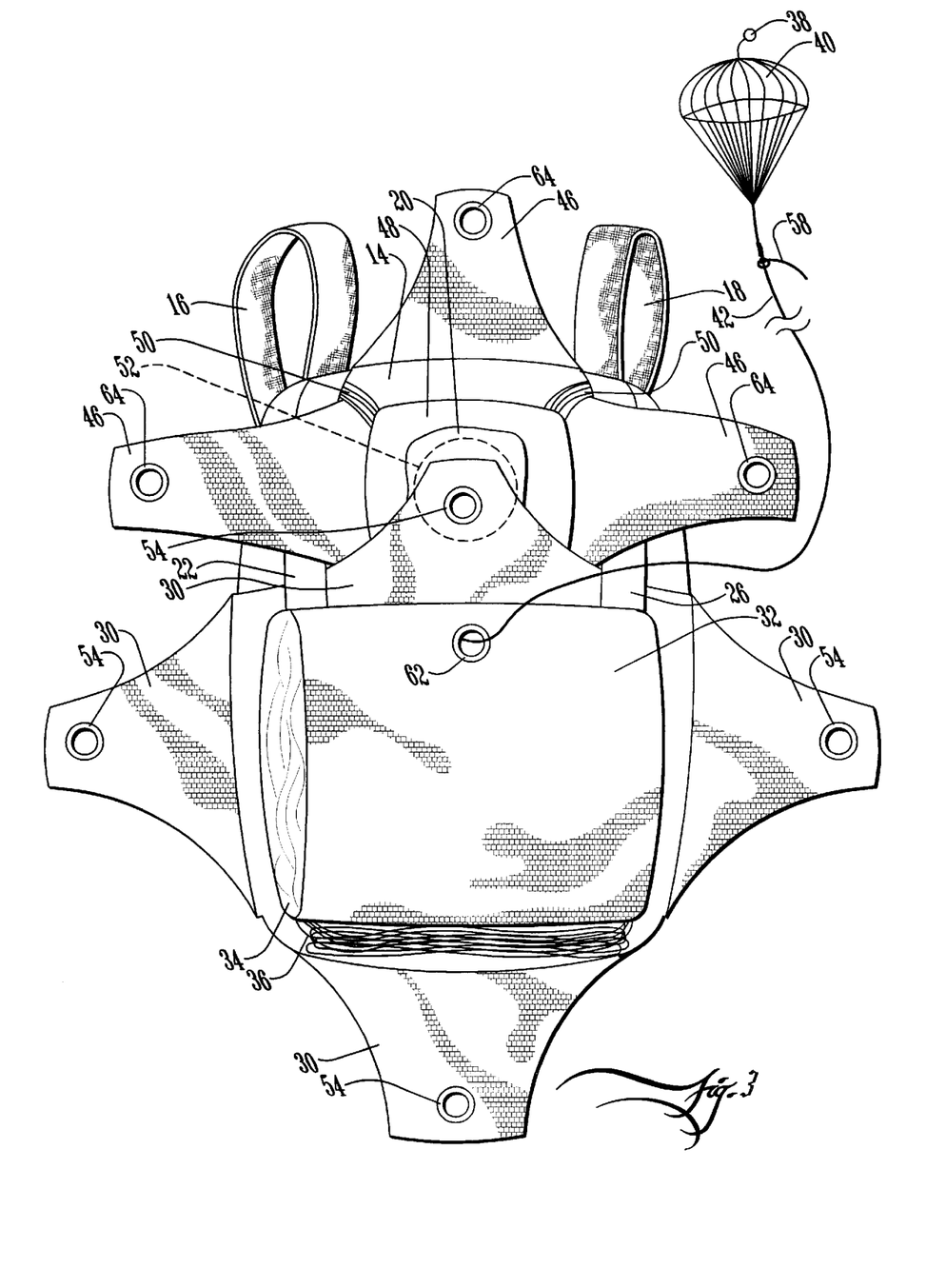
FIG. 3 illustrates a rear elevation of the parachute system of FIG. 1, shown with the container open and the pilot chute deployed.

Similarly, a right riser (26) is coupled to the right lift webbing (18) by a right quick release assembly (28). As shown in FIG. 3, the harness/container (14) includes a plurality of main flaps (30) provided around a deployment bag (32). Provided within the deployment bag (32) is a main canopy (34) connected by a plurality of suspension lines (36). The suspension lines (36) are coupled to either the left riser (22) or right riser (26). As shown in FIGS. 1 and 3, a handle, such as a ball (38) is coupled to a pilot chute (40) which, in turn, is coupled by a pilot chute bridle (42) to the main canopy (34). As shown in FIG. 1, the pilot chute (40) is provided within a pilot chute pocket (44) formed in the harness/container (14). Of course, the pilot chute (40) may be coupled to the harness/container (14) in any suitable way known in the art. As shown in FIG. 3, the harness/container (14) also includes a plurality of reserve flaps (46) provided around a reserve canopy (48). The reserve canopy (48) is also coupled to the left lift webbing (16) and a right lift webbing (18) by webbing (50) in a manner such as that well known in the art. Compressed inside the reserve pilot chute (20) is a spring (52) which provides forcible launch of a reserve pilot chute (20), coupled to the reserve canopy (48).

As shown in FIGS. 1 and 3, the main flaps (30) are provided with grommets (54) through which extends a closing loop (56). Provided through the closing loop (56) is a pin (58) having an eyelet (60) through which is secured the pilot chute bridle (42). The pilot chute bridle (42) extends past the eyelet (60) through a grommet (62) in the deployment bag (32) and connects to the main canopy (34).

Figure 5:
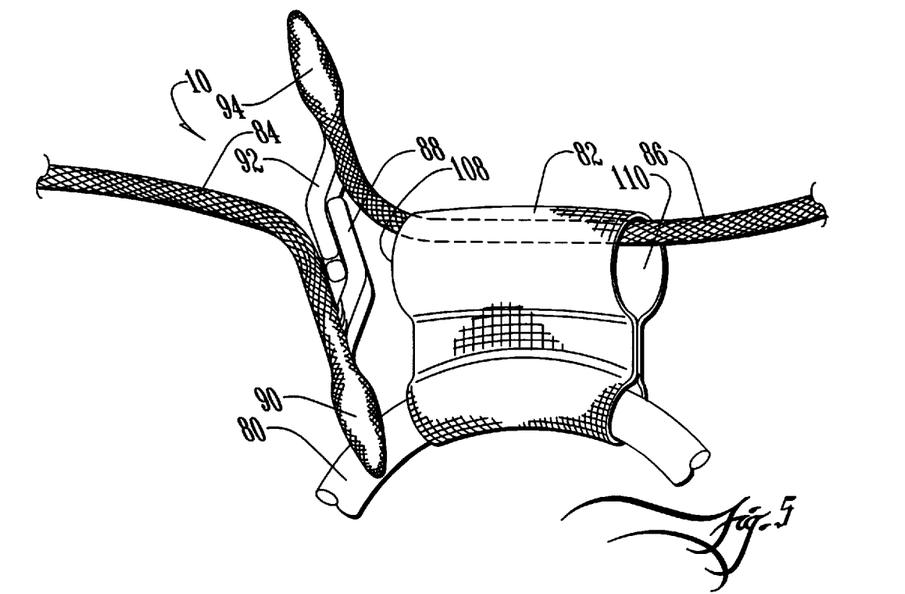
FIG. 5 illustrates a rear elevation of the actuation assembly of FIG. 4, shown with the left actuation lines removed from the container.

In a similar manner, the reserve flaps (46) are provided with grommets (64) through, which extends a closing loop (66). (FIGS. 1 and 3). A reserve pin (68) extends through the closing loop (66) and is swaged to a reserve ripcord (70). The reserve ripcord (70) is coupled through a sleeve (72) to a handle (74). The reserve ripcord (70) passes through two steel rings (76) and (78) which are sewn or otherwise affixed to the reserve flap (46). As shown in FIG. 5, a third steel ring (80) is provided around the reserve ripcord (70) between the two steel rings (76) and (78). The third steel ring (80) is coupled to a fabric sleeve (82) by any suitable means known in the art. Extending into the fabric sleeve (82) is a left actuation line (84) coupled to the left riser (22), and a right actuation line (86) coupled to the right riser (26).

Figure 4:
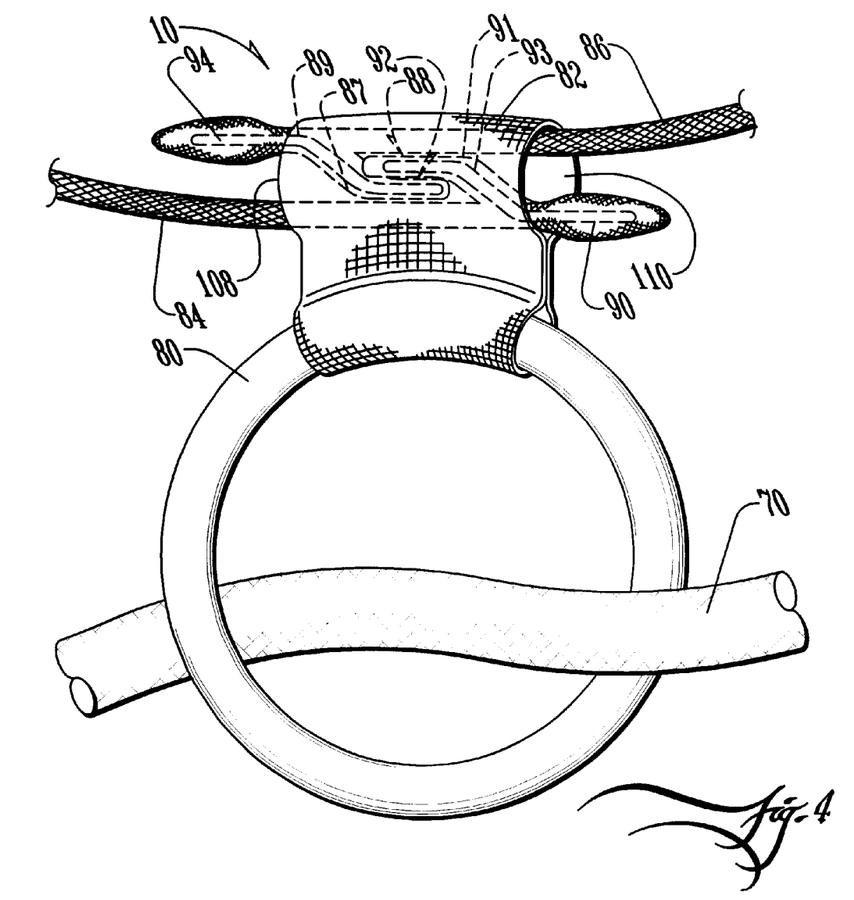
FIG. 4 illustrates a rear elevation in partial phantom, showing the actuation assembly of the present invention.

As shown in FIG. 4, the left actuation line (84) is of a nylon mesh construction. A left catch (88) is woven into the left actuation line (84) using a finger trap weave such as that known in the art, forming a thickened left keeper (90) out of the end of the left actuation line (84). Preferably, the left keeper (90) is melted or otherwise secured to prevent the left keeper (90) from fraying or allowing inadvertent removal of the left catch (88). Although in the preferred embodiment, the left catch (88) is constructed of a nylon line (87) surrounding a cylindrical piece of rubber (89) finger trapped into the left actuation line (84) to form the left catch (88) and left keeper (90), the left catch (88) may be of any construction suitable for preventing the left catch (88) from reentering the fabric sleeve (82) after it has been removed. The left catch (88) may be constructed of wood, metal, plastic or any desirable material. As shown in FIG. 4, the right actuation line (86) is also constructed of a webbed nylon material into which is finger trapped a right catch (92) comprising nylon line (91) surrounding a cylindrical piece of rubber (93). The right catch (92) is also constructed of a double thickness of nylon webbing material finger trapped upon itself. The right catch (92) extends into the right actuation line (86) to create a right keeper (94).

The actuation assembly (10) is designed to prevent deployment of the reserve pilot chute (20) if only a single riser (22) or (26) is released from the harness (14), and to deploy the reserve pilot chute (20) only upon release of both the left riser (22) and right riser (26) from the harness (14). This prevents the reserve pilot chute (20) from being deployed into the main canopy (34), tangling the two canopies (34) and (48), and causing a malfunction of the parachute system. By deploying the reserve pilot chute (20) only upon release of both the left riser (22) and right riser (26) from the harness (14), neither the risers (22) or (26) or the main canopy (34) will be in a position to entangle with the reserve pilot chute (20) or reserve canopy (48) upon their deployment.

In use, if there is a malfunction with the main canopy (34) upon deployment, a cutaway handle (96) is pulled downward from the right lift webbing (18). This downward motion actuates a first line (98),-coupled through a first steel sleeve (100) to the right quick release assembly (28). The cutaway handle (96) also actuates a second line (102), coupled through a second steel sleeve (104) to the left quick release assembly (24). Actuation of the cutaway handle (96) causes the first line (98) and second line (102) to operate the right quick release assembly (28) and left quick release assembly (24) to disengage the left riser (22) and right riser (26) from the harness (14). If the left riser (22) and right riser (26) leave the harness (14) instantaneously, the left actuation line (84) coupled to the left riser (22) and right actuation line (86) coupled to the right riser (26), pull equally. This prevents the left catch (88) and right catch (92) from moving past one another in the fabric sleeve (82). Therefore, as the left actuation line (84) and right actuation line (86) separate from the harness container (14) they pull the fabric sleeve (82) and steel ring (80) away from the harness container (14) as well. As the steel ring (80) leaves the harness container (14), the steel ring (80) pulls on the reserve rip-cord cord (70), pulling the reserve pin (68) free of the closing loop (66). Once the reserve pin (68) is clear of the closing loop (66), the steel ring (80) continues to pull out the reserve ripcord (70) until the reserve pin (68) moves through the steel ring (80). At this point, the steel ring (80) pulls clear of the reserve ripcord (70). When the reserve pin (68) releases the closing loop (66), the spring (52) is released to deploy the reserve pilot chute (20) through the reserve flaps (46).

Figure 6:
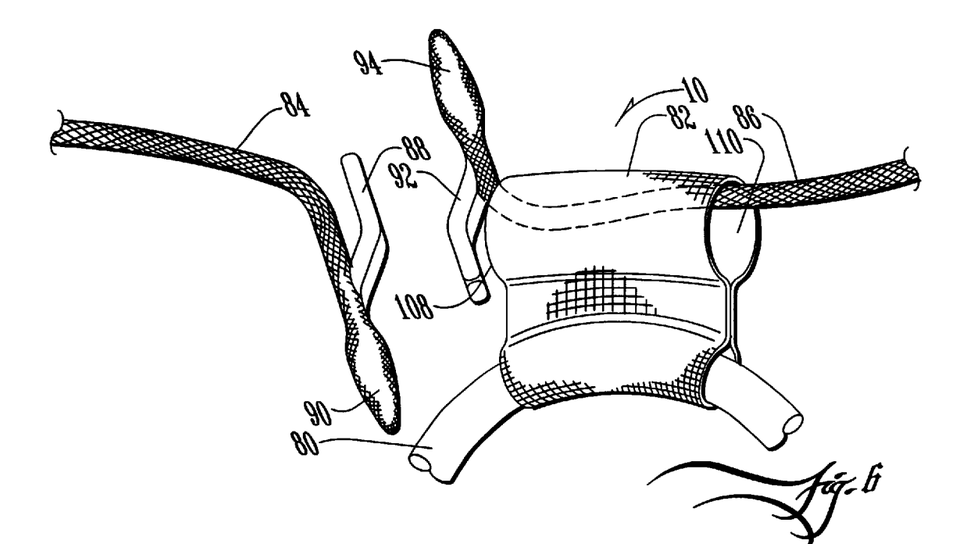
FIG. 6 illustrates a rear elevation of the actuation assembly of FIG. 5, shown with the left actuation line completely disengaged from the remainder of the actuation assembly and the remaining actuation line coupled to the container.

Much more likely than the risers (22) and (26) releasing precisely simultaneously, is one riser releasing more or less quickly than the other. If the left riser (22) were to release from the harness (14) slightly sooner than the right riser (26), or if the right riser (26) were to become entangled with the harness (14) or otherwise prevented from releasing from the harness (14), the left riser (22) would pull the left actuation line (84) away from the harness container (14), along with the left riser (22). The left actuation line (84) pulls the left catch (88) against the right catch (92), pulling the right catch (92) out of a first end (108) of the fabric sleeve (82). Since the left catch (88) is provided around the entire end of the right catch (92), the right catch (92) must completely exit the first end (108) of the fabric sleeve (82) before the left catch (88) can be released from the right catch (92). As the left catch (88) exits the fabric sleeve (82), the left catch (88) continues to pull the right catch (92) away from the right actuation line (86). This action rotates the right catch (92) and right keeper (94) toward a substantially perpendicular orientation relative to the right actuation line (86) until the left catch (88) releases and moves away from the harness container (14), along with the left actuation line (84) and left riser (22). Accordingly, if the left riser (22) releases from the harness (14), the left actuation line (84) moves away from the harness container (14) without removing the reserve pin (68) and deploying the reserve pilot chute (20) (FIGS. 1, 3 and 6). The reserve pilot chute (20) will not deploy until the right riser (26) also releases from the harness (14).

Once the right riser (26) releases from the harness (14), either from proper actuation of the cutaway handle (96) or manual manipulation of the right quick release assembly (28) or otherwise, the right riser (26) moves away from the harness container (14), pulling with it the right actuation line (86). If, as noted above, the left riser (22) has previously released from the harness (14), the right catch (92) and right keeper (94) are no longer oriented parallel to the right actuation line (86), but instead have been rotated by the left catch (88). Accordingly, as the right actuation line (86)

moves away from the harness container (14) along with the right riser (26), the right keeper (94) and right catch (92) cannot reenter the fabric sleeve (82) despite being pulled by the right actuation line (86). Although the right catch (92) and right keeper (94) may be of any suitable construction, they are preferably designed to rotate relative to the right actuation line (86) upon removal of the left catch (88) from the fabric sleeve (82), to prevent reentry of the right catch (92) and right keeper (94) into the fabric sleeve (82).

As the right riser (26) moves away from the harness container (14), the tension applied to the right actuation line (86), by the departing right riser (26) is resisted by the right catch (92) and right keeper (94) catching against the first end (108) of the fabric sleeve (82). As the right actuation line (86) continues to pull, tension is transmitted from the right catch (92) and right keeper (94) through the fabric sleeve (82) to the steel ring (80). The right actuation line (86) continues to pull until the steel ring (80) moves away from the harness container (14), pulling the reserve pin (68) free from the closing loop (66). As the reserve pin (68) pulls free, the spring (52) deploys the reserve pilot chute (20).

The reserve pilot chute (20) is not deployed, therefore, until both the left riser (22) and right riser (26) have been released from the harness (14). Similarly, if the right riser (26) were to release from the harness (14) prior to the left riser (22), the right actuation line (86) would force the right catch (92) against the left catch (88), forcing it out of a second end (110) of the fabric sleeve (82). Upon exiting the second end (110) of the fabric sleeve (82), the right catch (92) would rotate the left catch (88) and left keeper (90) relative to the left actuation line (84), thereby preventing the left catch (88) and left keeper (90) from reentering the fabric sleeve (82). Accordingly, once the left riser (22) releases from the harness (14), the left actuation line (84) transmits tension to the left catch (88) and left keeper (90), and pulls the fabric sleeve (82) and steel ring (80), releasing the reserve pin (68) and deploying the reserve pilot chute (20).

Figure 7:
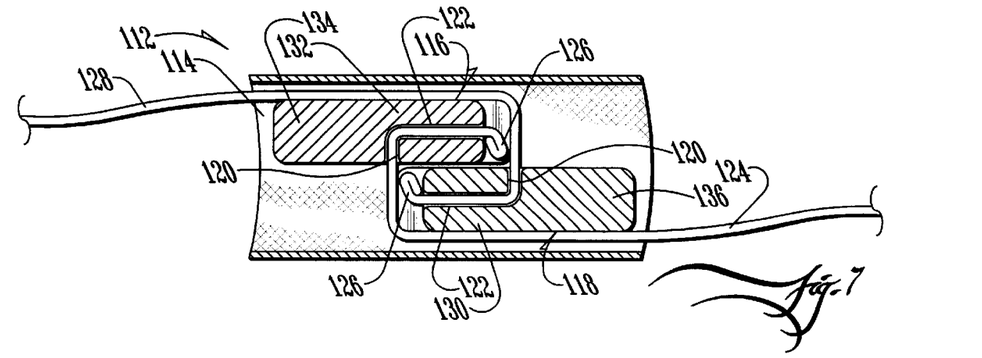
FIG. 7 illustrates a rear elevation in cross-section of a first alternative embodiment of the present invention.

An alternative embodiment of the present invention is shown in FIG. 7. The first alternative actuation assembly is designated as (112) in FIG. 7 and includes a cylindrical container (114). Provided within the container are a first right block (116) and a left block (118). The right block (116) is provided with a center bore (120) connected to a side bore (122). A right actuation line extends through the center bore (120) and side bore (122) and is provided with a knot (126) to prevent inadvertent release of the right actuation line (124) from the right block (116). A left actuation line (128) is similarly secured to the left block (118). Accordingly, when tension is applied to the left actuation line (128), the left actuation line (128) coacts with the left block (118) to move the right block (116) out of the cylindrical container (114). As the left block (118) exits the cylindrical container (114), a right catch portion (132) of the left block (118) extends around a right catch portion (132) of the right block (116) and rotates the right block (116) relative to the right actuation line (124) and container (114).

Therefore, if tension is applied to the right actuation line (124), the right catch portion (132) and a right keeper portion (134) of the right block (116) are now perpendicular to the container (114) preventing the right block (116) from reentering the container (114). As additional tension is applied to the right actuation line (124), the container (114) is pulled along with the right actuation line (124) to actuate and deploy a reserve canopy. Similarly, if tension is first applied to the right actuation line (124), the right actuation line (124) and right block (116) pull the left block (118) out of the container (114) and rotate the left block (118) relative to the container (114). This positions the left catch portion (130) and a left keeper portion (136) of the left block (118) perpendicular to the container (114), prevents the left block (118) from reentering the container (114) as tension is applied to the left actuation line (128). Additional tension applied to the left actuation line (128) causes the reserve canopy to deploy as described above.

Figure 8:
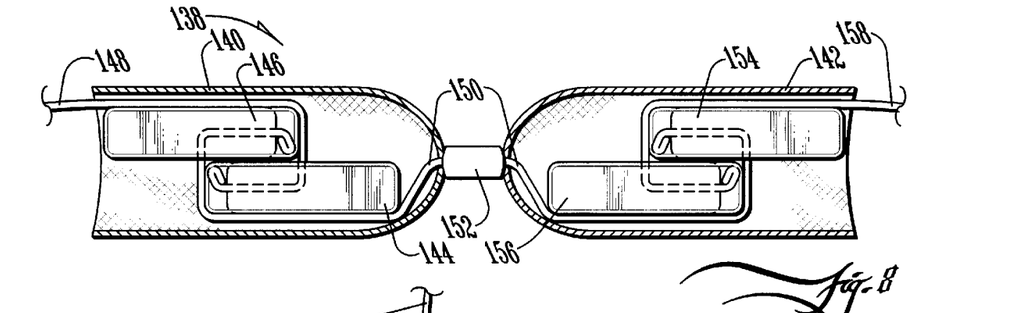
FIG. 8 illustrates a rear elevation in cross-section of a second alternative embodiment of the present invention.

A second alternative embodiment of the present invention is shown generally as (138) in FIG. 8. This embodiment of the present invention provides a left container (140) and a right container (142). Provided in the left container (140) is a left catch block (144) and a left keeper block (146). As shown, the left catch block (144) is coupled to a left actuation line (148) and the left keeper block (146) is coupled to a keeper line (150). The keeper line (150) extends out of the left container (140) through a resilient sleeve (152) and into the right container (142) and couples to a right keeper block (154). Also provided within the right container (142) is a right catch block (156) coupled to a right actuation line (158). When tension is applied to the left actuation line, the left catch block (144) is pulled from the left container (140) along with the left keeper block (146). This action rotates the left keeper block (146) and prevents the left keeper block (146) from reentering the left container (140). Once the left keeper block !146) is prevented from reentering the left container (140),. the keeper line (150) is too short to allow the right keeper block (154) to move sufficiently to allow the right catch block (156) to exit the right container (142). Accordingly, if tension is thereafter applied to the right actuation line (158), the right catch block (156) does not exit the container (142) but, instead, pulls the entire container (142) to move a reserve pin (not shown) coupled thereto and deploy a reserve canopy (not shown) as described above. The resilient sleeve (152) acts to reduce play in the keeper line (150) and prevent inadvertent removal of the blocks (144), (146), (154) and (156) from the containers (140) and (142).

Figure 9:
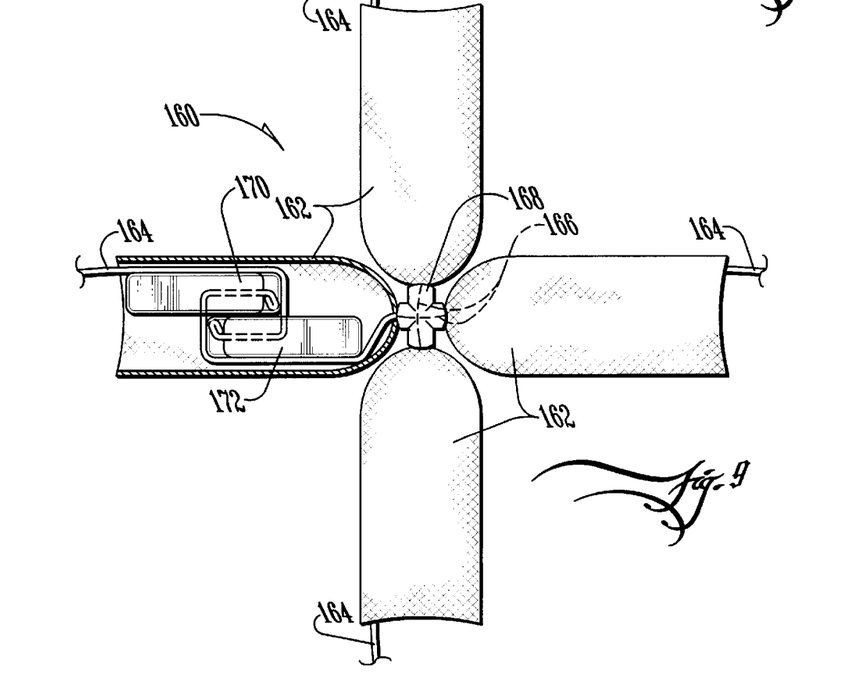
FIG. 9 illustrates a rear elevation in partial cutaway of a third alternative embodiment of the present invention.

A third alternative embodiment of the present invention is shown generally as (160) in FIG. 9. In this embodiment, four containers (162) are secured to one another and are provided along with four actuation lines (164). All of the containers (162) are coupled to one another by an X-shaped keeper line (166) provided within an X-shaped resilient sleeve (168).

Each container (162) is provided with a keeper block (170) and a catch block (172). The size of the blocks (170) and (172), the length of the X-shaped keeper line (166), and size of the containers (162) are designed so that there is enough play in the X-shaped keeper line (166) to allow the catch blocks (172) to be removed from all but one of the containers (162). When all but one of the keeper blocks (170) have been connected to the containers (162), there is insufficient play in the X-shaped keeper line (166) to allow the final catch block (172) to be removed from its respective container (162). Accordingly, when only one actuation line (164) remains to be released from its container (162), the remaining keeper block (170) maintains the catch block (172) within the container (162), causing the sole remaining actuation line (164) to pull the entire assembly, thereby releasing a reserve pin (not shown) and deploying a reserve pilot chute (20).

Although the invention has been described with respect to a preferred embodiment thereof, it is to be also understood that it is not to be so limited, since changes and modifications can be made therein which are within the full intended scope of this invention as defined by the appended claims. For example, it should be noted that the actuation assembly (10) may be utilized in association with any type of equipment where it is desired to allow one or more actuation lines to be removed without causing an associated actuation of a particular device until an attempt is made to remove a final actuation line.

What is claimed is:

1. A variable release system comprising:
   a. a first catch
   b. a second catch
   c. a container containing at least a portion of said first catch and at least a portion of said second catch;
   d. means for releasing said first catch from said container;
   e. means for removing said second catch from said container when said first catch is released from said container; and
   f. means for connecting said second catch to said container when said first catch is released from said container.

2. The variable release system of claim 1, further comprising:
   a. means for releasing said second catch from said container;
   b. means for removing said first catch from said container when said second catch is released from said container; and
   c. means for connecting said first catch to said container when said second catch is released from said container.

3. The variable release system of claim 2, wherein said container defines a first opening and a second opening, and wherein said means for releasing said first catch is means for drawing said first catch through said first opening and wherein said means for connecting said second catch to said container is means for preventing said second catch from moving into said container through said first opening.

4. The variable release system of claim 3, wherein said first catch preventing means is a first end of a line.

5. The variable release system of claim 2, wherein said means for removing said second catch is a first appendage provided on said first catch, and wherein said means for removing said first catch is a second appendage provided on said second catch.

6. The variable release system of claim 2, wherein said means for connecting said second catch is a first keeper provided on said second catch and wherein said means for connecting said first catch is a second keeper provided on said first catch.

7. The variable release system of claim 6, wherein said first catch is a first line, wherein said second keeper is a second line coupled to said first line, wherein said second catch is a third line and wherein said first keeper is a fourth line coupled to said third line.

8. The variable release system of claim 1, wherein said container is flexible.

9. The variable release system of claim 1, wherein said means for releasing said first catch is a line.

10. The variable release system of claim 9, wherein said means for removing said second catch is a portion of said line provided around at least a portion of said second catch.

11. The variable release system of claim 1, wherein said variable release system weighs less than 5 kilograms.

12. The variable release system of claim 1, further comprising:
   a. a canopy;
   b. a first riser coupled to said canopy and coupled to said means for releasing said first catch;
   c. a second riser coupled to said canopy and coupled to said means for releasing said second catch;
   d. a reserve canopy; and
   e. means coupled to said container for releasing said reserve canopy.

13. A variable release system comprising:
   a. a first catch;
   b. a first keeper trapping said first catch;
   c. a second catch;
   d. a second keeper trapping said second catch, wherein said second keeper is coupled to said first keeper;
   e. means coupled to said first catch for releasing said first catch from said first keeper when said first catch is not the last catch trapped by a keeper;
   f. means coupled to said second catch for releasing said second catch from said second keeper when said second catch is not said last catch trapped by a keeper;
   g. means coupled to said first keeper for preventing said first catch from releasing from said first keeper when said first catch is said last catch trapped by a keeper; and
   h. means coupled to said second keeper for preventing said second catch from releasing from said second keeper when said second catch is said last catch trapped by a keeper.

14. The variable release system of claim 13, further comprising an enclosure provided around said first catch and said first keeper.

15. The variable release system of claim 14, wherein said enclosure comprises a base and a sidewall defining an opening.

16. The variable release system of claim 15, wherein said opening comprises a width and wherein said first keeper comprises:
   a. a first dimension less than said width of said opening; and
   b. a second dimension greater than said width of said opening.

17. The variable release system of claim 13, wherein said first catch is a first block having a center and wherein said first catch releasing means is a catch line coupled to said first catch a first distance from said center of said first catch, and wherein said first keeper is a second block having a center and wherein said first keeper preventing means is a keeper line coupled to said first keeper a second distance from said center of said first keeper.

18. The variable release system of claim 13, further comprising:
   a. a third catch;
   b. a third keeper trapping said third catch, wherein said third keeper is coupled to said first keeper;
   c. means coupled to said third catch for releasing said third catch from said third keeper when said third catch is not said last catch trapped by a keeper; and
   d. means coupled to said third keeper for preventing said third catch from releasing from said third keeper when said third catch is said last catch trapped by a keeper.

19. The variable release system of claim 13, wherein said first keeper comprises:
   a. a first end;
   b. a second end;
   c. a first side;
   d. a second side; and
   e. wherein said first catch releasing means is a catch line wherein said first catch is positioned over at least a portion of said first side of said first keeper; and
   f. wherein said catch line is coupled to said first catch and extends over at least a portion of said second side of said first keeper.

20. The variable release system of claim 19, wherein said second keeper is coupled to said first keeper by a keeper line and further comprising means for applying tension to said keeper line.

21. A reserve parachute release system comprising:
   h. a main canopy;
   i. a harness;
   j. a first riser coupled between said main canopy and said harness;
   k. a second riser coupled between said canopy and said harness;
   l. a reserve canopy;
   m. a reserve ripcord; and
   n. means coupled to said first riser, said second riser and said ripcord for activating said ripcord only upon disconnection of both said first riser and said second riser from said harness.

* * * * *